May 11, 1954
J. T. HANSEN
2,677,891
MEANS FOR MEASURING PITCH DIAMETER OF V-BELT PULLEYS
Filed March 14, 1949
3 Sheets-Sheet 1
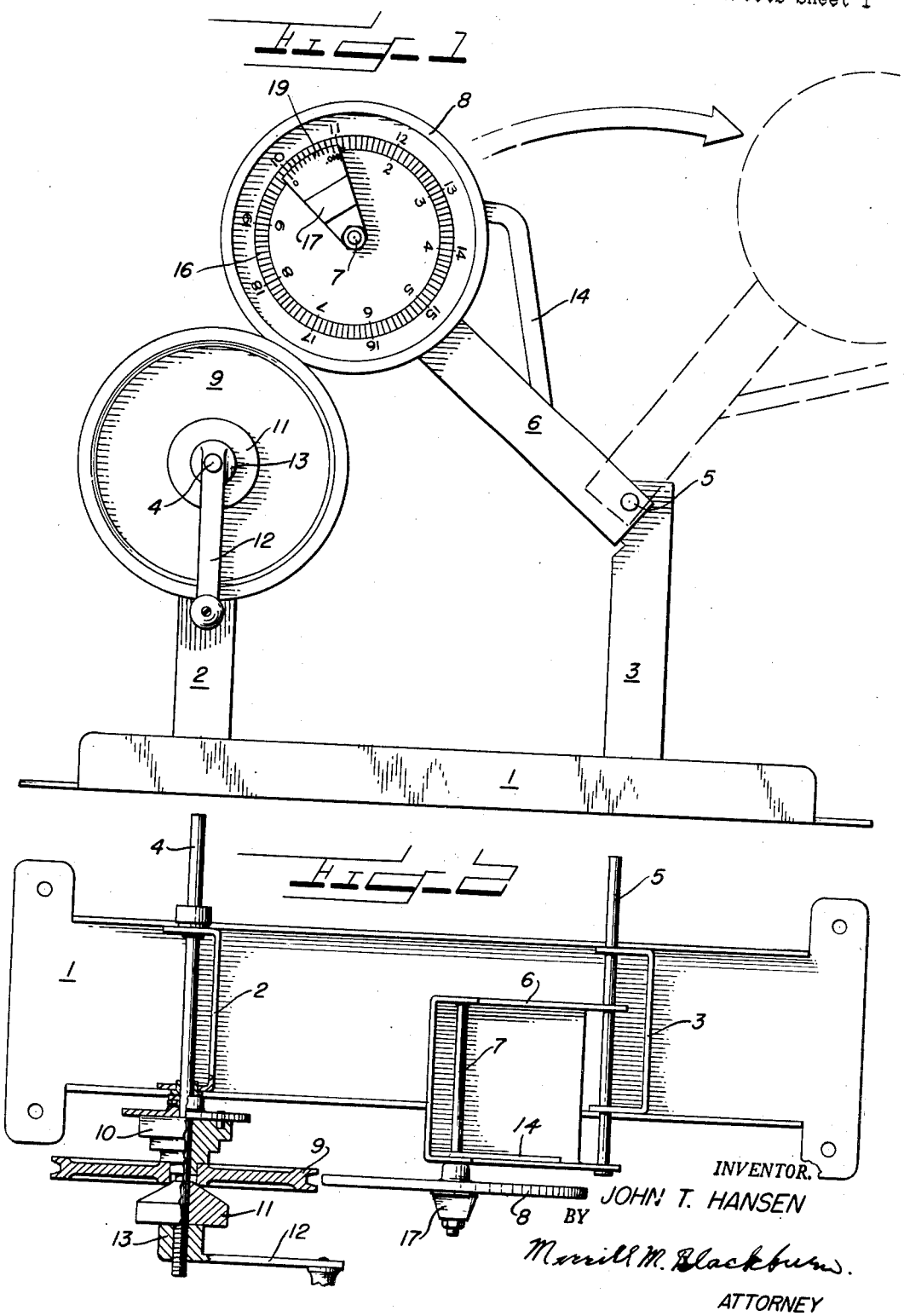
INVENTOR.
JOHN T. HANSEN
BY
Merrill M. Blackburn
ATTORNEY May 11, 1954
J. T. HANSEN
2,677,891
MEANS FOR MEASURING PITCH DIAMETER OF V-BELT PULLEYS
Filed March 14, 1949
3 Sheets-Sheet 2
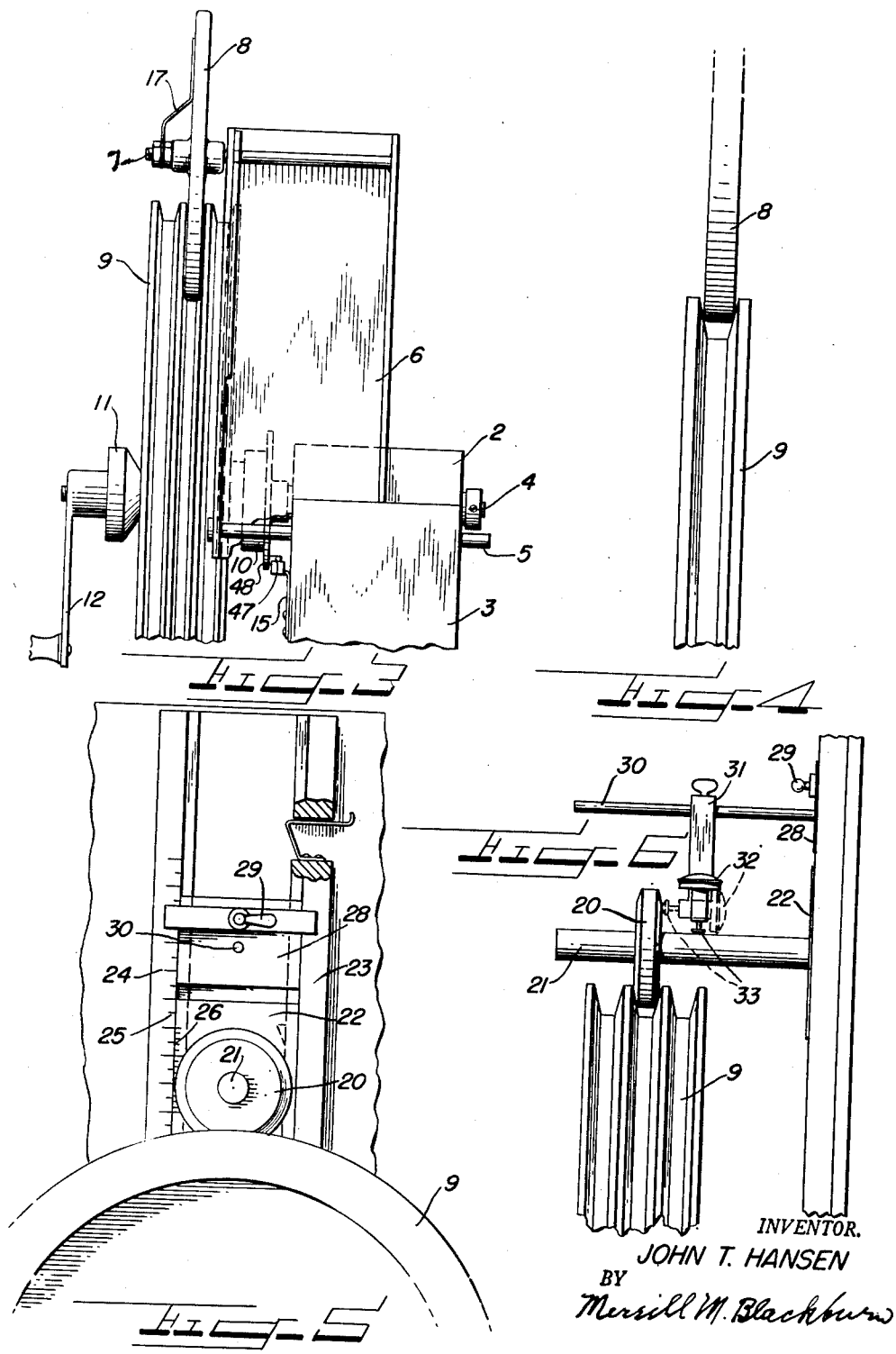
INVENTOR.
JOHN T. HANSEN
BY
Merrill M. Blackburn.
ATTORNEY

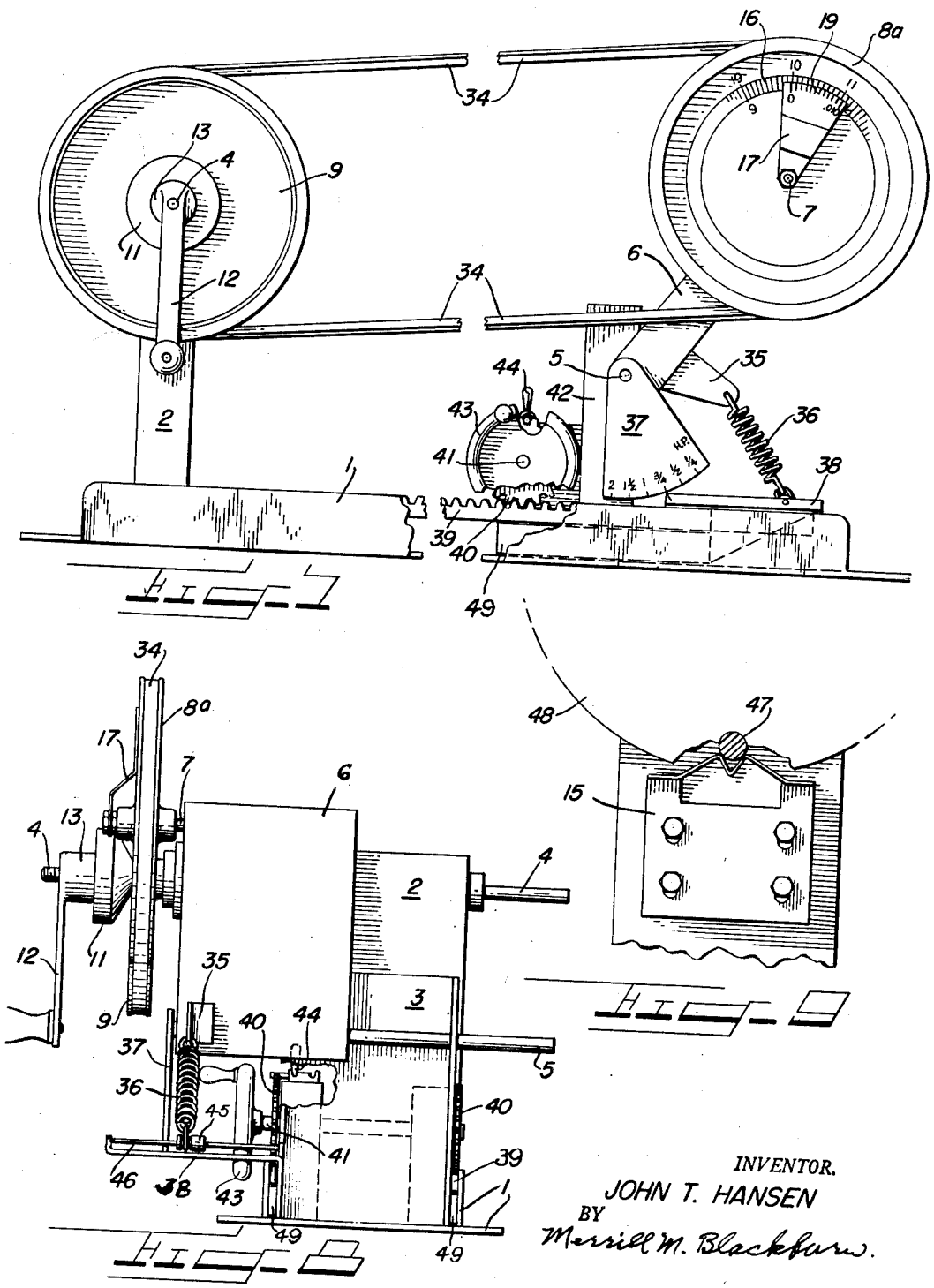

Patented May 11, 1954

2,677,891

UNITED STATES PATENT OFFICE 2,677,891

MEANS FOR MEASURING PITCH DIAMETER OF V-BELT PULLEYS

John T. Hansen, Moline, Ill.

Application March 14, 1949, Serial No. 81,356

5 Claims. (Cl. 33—141)

My present invention relates to the accurate measurement of the pitch diameters of V-belt pulleys, the measurements of which have heretofore been merely approximations.

V-belt drives are devices for transmitting power from one rotating shaft to another by means of V-pulleys and belts of the same shape. The shafts are usually parallel and there is nearly always a step-down or a step-up in speed from the drive shaft to the driven shaft. The ratio of the speed of the one to the other is called the speed ratio, and this may vary enough, by reason of inaccurate measurements, to make considerable difference in the running of machinery.

Ordinarily, industrial V-belt drives are made in six standard sizes which are indicated by the letters O, A, B, C, D, and E, and which, in practice, vary in nominal width at the outside from three-eighths inch (⅜″) to one and one-half inches (1½″). The sheaves or pulleys are manufactured in the same series of groove widths, although the A and B sizes are sometimes combined into a "combination groove." The sheaves are made with varying numbers of grooves which may be from one to ten, depending upon the horse power to be transmitted. The material of the pulleys may be cast iron, cast steel, die-cast aluminum or zinc, or stamped and welded sheet steel, although they are not inherently limited to such materials.

The principal manufacturers of these pulleys have standardized on the dimensions of the grooves, based on a given width for each belt-size cross-section at the pitch diameter. It is at this pitch width that the pulley pitch diameters are to be measured by this new mechanism. There are many factors affecting the relative operating speeds of driving V-belt pulleys and driven pulleys, among which are errors in constructional details of the pulleys themselves, as well as wear because of use. Where multi-groove pulleys are to be used, it is important that the pitch diameters of the drive pulleys be uniform, and the same applies also to the driven pulleys in order that the load on the belts shall be uniform. Otherwise, one belt may be overloaded and may break. It is therefore important that all of the pulleys be checked against the same standards.

It is therefore an object of this invention to provide a means for making accurate measurements of the pitch diameters of V-belt pulleys in a quick and practical way. I desire also to provide such other and further advantages as are inherent in the structure herein disclosed.

In the drawings annexed hereto and forming a part hereof,

Fig. 1 is a side elevation of one embodiment of this invention;

Fig. 2 is a plan view thereof;

Fig. 3 is a partial end view of this construction used in checking a multi-groove V-pulley;

Fig. 4 is a partial edge view of a single groove pulley on an enlarged scale, showing the same being checked;

Fig. 5 shows another embodiment of this invention;

Fig. 6 shows a still further modification adapted to show variations in the radius of the multiple pulley and wabble thereof;

Fig. 7 shows a side view of another species of a machine for checking the size of a belt pulley;

Fig. 8 is an end view of the structure shown in Fig. 7; and

Fig. 9 is a fragmentary elevation of a structure for holding a V-belt pulley in a definite starting and stopping position.

Reference will now be made in greater detail to the annexed drawings for a more complete description of this invention. This apparatus is provided with a supporting base 1 from which rise brackets 2 and 3 which serve as supports for the operating mechanism. Adjacent the upper end of the bracket 2 is mounted a shaft 4 which is longitudinally adjustable to a position, as well as being rotatable. Toward the other end of the base 1, the bracket 3 rises and in this is slidably mounted a shaft 5 upon which is pivotally mounted a supporting bracket 6 carrying a fixed shaft 7. On this shaft 7 is mounted the standard measuring wheel 8 by means of which measurements are made. The edges of this wheel are preferably rounded, with a very small radius, to fit in the groove of the V-pulley 9 which is being checked, to engage same at the point of the pitch diameter. The standard wheel and its supporting member are in such a position that gravity will hold the wheel against both sides of the groove of the V-belt pulley 9.

Since these V-pulleys are made with several standard sizes of central holes for the mounting thereof, it is necessary to provide an adapter having various size hubs to fit these different size openings in the pulleys. In use, pulley 9 is put on the shaft 4 and slipped on the particular hub which it fits. The cone 11 is then put on the threaded end of the shaft 4, and the crank 12, having an internally threaded hub 13, is screwed on the shaft 4 to hold the cone in place. This cone holds the pulley 9 definitely positioned. The support 6 and standard wheel 8 are now turned about the shaft 5 and moved axially in or out until the wheel 8 will fit in the groove of the pulley 9. It is then let into the groove of the pulley being checked. For manipulating the support 6 and wheel 8, a handle 14 is secured to the support 6. It is clear that, by manipulating the handle 14, the wheel 8 may be revolved about the axis of the shaft 5 to get it out of contact with the pulley 9 and it, together with the support 6, can be moved in or out to get the wheel 8 in alignment with any pulley 9 positioned on the drum adapter 10.

As shown in Figs. 3 and 9, a formed spring plate member 15, mounted on the support 2, has at its free end a V-shaped groove which is engaged by a pin 47 on the back face of the disc 48, and it is therefore in a position to stop the pulley 9 at a definite point so that the pitch circumference of the pulley 9 will always be measured around the pulley from a fixed point and back to the same point. From this pitch circumference, the pitch diameter can readily be read, by use of proper graduations 16, on the standard wheel 8, carrying the gauge scale 16. This gauge scale has an inner circle of numerals from zero to ten and an outer series of numerals from ten to twenty. An indicating plate 17 is fixedly mounted on the shaft and carries a vernier scale 19 for subdividing the units of the scale 16.

When the stop, carried by the plate 15, engages in the depression in the spring, as shown in Fig. 9, the pulley 9 is regarded as in measuring position. Then, with the wheel 8 out of contact with the pulley 9, the zero of plate 17 is set in alignment with the "0," "10," or "20" of scale 16, and the apparatus is then in position to start the measurement. Now the handle 14 is turned about the axis of the shaft 5 until the wheel 8 engages with a groove in the pulley 9. Next, the handle of the crank 12 is grasped and it is turned about the axis of the shaft 4, the projection on spring member 15 being released from the pin 47. Now when crank 12 is turned, it will result in pulley 9 being rotated, and this will rotate the standard wheel 8 because of the contact of the two wheels. The crank 12 is turned through one complete revolution until the pin 47 again engages the groove of the spring 15, indicating that the pulley 9 has been turned through exactly one complete revolution. The pitch diameter of the unknown pulley 9, which is being measured, is now read directly on the scale 16. If the pitch diameters of the two wheels 8 and 9 are identical, then the zero point will stop at "10" on the scale 16, indicating that the pitch diameter of the pulley 9 is ten inches (10"). If the pulley 9 is smaller than the wheel 8, then the reading on the scale 16 will be less than "10." On the other hand, if the pulley 9 is larger than the wheel 8, the reading on the scale 16 will be on the outer circle of the numerals, instead of on the inner circle, indicating that the pitch diameter is greater than ten inches (10"). The pitch diameter, in inches and tenths, can be read directly on the scale 16, but if it is necessary to read hundredths of an inch, the hundredths can be read by means of the vernier scale 19. The standard wheel 8, illustrated, is based on a ten inch (10") diameter at the point of contact. However, wheels of other size may be used.

Fig. 3 shows the use of the standard wheel 8 in measuring the pitch diameter of the middle groove of the triple groove pulley, while Fig. 4 shows the measurement of the pitch diameter of a single groove pulley. It will of course be understood that, when measuring a multiple groove pulley, it may be necessary to measure each of the pulleys in order to see that the units of the multiple pulley have the same pitch diameter. Otherwise, there will not be the same tension exerted on the belts running over these pulleys, and the belts will not be working equally.

The mechanism shown in Figs. 5 and 6 is another species of machine for the reading directly of the pitch diameter of the pulley 9 and may be used with a single unknown pulley or a multiple groove pulley, the standard wheel 20 being slidably mounted on a fixed shaft 21, carried by a slide 22 which moves upwardly and downwardly between the guides 23 and 24. If the pulley 9 of this construction be rotated and the pitch diameter be not uniform, the graduations of the vernier 26 will vary with relation to the graduations 25, showing irregularity of pulley 9.

In order to check the amount of eccentricity of the pulley 9, a slide 28, movable lengthwise of the guides 23 and 24 may be equipped with a securing means 29 by which the position of the slide 28, with relation to the guides 23 and 24, may be fixed. This slide 28 has a fixed shaft 30 projecting laterally therefrom, as shown in Fig. 6, and carries a gauge support unit 31, on the lower end of which is mounted the readable part of the indicator, indicated broadly by the numeral 32. This has a contacting member 33 which contacts the shaft 21 and may be used for determining the vertical movement of this shaft, since slide 22 is free to float. As indicated in Fig. 6, the indicator 32 may be turned about a pivot so that this unit may also be used to determine the amount of wobble of the groove or grooves in the pulley 9.

The structure of Figs. 7 and 8 is another form of this construction for accomplishing a driving relation between the standard and the unknown pulley. In this structure, as in that previously described, there is a supporting base from which rises the support 2, carrying the shaft 4 and cone 11. As with the structure shown in Figs. 1, 2, and 5, the pulley 9 of Fig. 7 starts from a fixed starting point, and the wheel 8a has the vernier 19 set with its zero (0) at substantially "10." The belt 34 is put around the wheels 8a and 9, with the latter held in stopping position and the former set at starting position. The arm 6, carrying the wheel 8a, has a bracket 35 projecting therefrom, as shown in Fig. 7, and to one end of this is connected a spring 36, the second end of which is connected to a slide 45 on a rod 46. This spring 36 pulls downwardly on the bracket 35 and, therefore, on the supporting arm 6. This moves the wheel 8a outwardly and downwardly, placing a tension on the belt 34. The spring is of such a length and tension that it produces on the belt 34 the desired tension which corresponds in use to the tension which would be placed on the belt 34 when in commercial use. The belt 34 may be the actual belt which is to be used with the pulley.

A sector 37 is secured to the shaft 5 so that the sector swings about the axis of this shaft in the same manner that the support 6 moves about it. The edge of this sector is graduated to indicate horse power so that it may be told by looking at these graduations what tension the belt is supposed to exert in use. A plate 38 is secured to the upright 42 through the guide 49, and it is to this plate that the spring 36 is secured through the rod 46 and the slide 45. This plate is so mounted that one edge thereof is in close proximity to the sector 37 and may be used as an index mark when referring to the scale on the sector.

A rack 39 fixedly mounted in the base 1 cooperates with a gear 40 mounted on the shaft 41 which is fixedly connected to the supporting bracket 42, except that it is rotatable with relation to its mounting. It will be understood that, by reason of the hand wheel 43 on the shaft 41, it will be possible to rotate the gears 40 whereby to cause them to travel on the racks 39 and adjust the tension of the spring 36. A latching mechanism 44 makes it possible to latch the gear 40 in place so as to maintain a substantial and constant tension on the belt 34. This latching mechanism 44 comprises a lever indirectly mounted on the framework in such a manner that one end of the lever engages between the teeth of one of the gears 40.

It will of course be understood that the specific description of structure set forth above may be departed from without departing from the spirit of this invention as disclosed in this specification and these drawings or the scope of the claims hereto annexed.

Having now described my invention, I claim:

1. Means for measuring the pitch diameter of a V-belt pulley, comprising a supporting means for supporting a shaft having a grooved pulley secured thereon, of which the pitch diameter is to be measured, cooperating means rotatable with said shaft and carried by said supporting means, respectively, for causing said pulley and shaft to be rotated exactly one revolution or a multiple thereof in making a measurement, a measuring wheel of standardized width and diameter supported to contact the inside faces of the V-groove of the V-belt pulley at the pitch diameter line thereof, and means in connection with the measuring wheel for indicating the pitch diameter by the amount of rotation of the measuring wheel.

2. A means for measuring the pitch diameter of a V-belt pulley, comprising a supporting structure, a shaft carried rotatably thereby, a device carried by said shaft for centering and securing a grooved V-belt pulley thereon having a definite width and diameter at the pitch diameter, said shaft being rotatable exactly one or more revolutions, a measuring wheel of predetermined width and diameter at the periphery thereof, said width and diameter corresponding to the two circles of pitch diameter of a standard pulley of type being measured, means connected to said supporting structure for rotatably supporting said wheel for peripheral engagement with said pulley, a releasable detent carried by one of said shaft and supporting structures, and a detent receiver carried by the other of said shaft and supporting structures for indicating when said shaft has been rotated through substantially one revolution of a multiple thereof.

3. A structure according to claim 2 having a scale on the measuring wheel and an indicator carried in relatively fixed relation by said supporting structure in a position adjacent the scale on the measuring wheel to indicate the average pitch diameter by measuring the pitch circumference of the V-belt pulley by the amount of rotation of the measuring wheel.

4. A structure for the purpose indicated comprising a rotatably supported shaft for supporting a V-belt pulley of unknown dimensions for rotation in a substantially vertical plane, latching means for holding said shaft and pulley at a definite starting position, a standardized wheel supported for engagement, edgewise, with the edge groove of the V-belt pulley, said standardized wheel entering into the groove of the V-belt pulley only to the pitch line, and a measuring scale carried by the standardized pulley and serving to indicate the amount of rotation of the V-belt pulley.

5. A structure for the purpose indicated comprising a rotatably supported shaft for supporting a V-belt pulley of unknown dimensions for rotation in a substantially vertical plane, latching means for holding said shaft and pulley at a definite starting position, a standardized wheel supported for rotation and for swinging movement about axes that are substantially parallel to the axis of rotation of said shaft and pulley, said standardized wheel being swingable toward and away from said pulley to be measured, means responsive to swinging movement of said wheel relative to said pulley and shaft to effect a driving connection between said pulley and shaft substantially at the pitch circle of said pulley, a measuring scale carried by the standardized pulley and serving to indicate the amount of rotation of the V-belt pulley, and a relatively stationary indicator cooperating with said measuring scale, said indicator being graduated to indicate fractional parts of a revolution of said wheel.

References Cited in the file of this patent

UNITED STATES PATENTS

| Number | Name | Date |
|---|---|---|
| 293,768 | Munton | Feb. 19, 1884 |
| 480,607 | McCallum | Aug. 9, 1892 |
| 1,098,760 | Reed | June 2, 1914 |
| 1,423,339 | Ledell | July 18, 1922 |
| 1,528,315 | Barr et al. | Mar. 3, 1925 |
| 2,269,650 | Cooney | Jan. 13, 1942 |
| 2,361,888 | Wainwright | Oct. 31, 1944 |

FOREIGN PATENTS

| Number | Country | Date |
|---|---|---|
| 281,996 | Great Britain | July 12, 1928 |